United States Patent
Spahr et al.

(10) Patent No.: US 10,286,726 B2
(45) Date of Patent: May 14, 2019

(54) HUB, IN PARTICULAR FOR PARTIALLY MUSCLE-POWERED VEHICLES

(71) Applicant: DT SWISS INC., Grand Junction, CO (US)

(72) Inventors: Stefan Spahr, Lengnau (CH); Martin Walthert, Aarberg (CH)

(73) Assignee: DT SWISS INC., Grand Junction, CO (US)

( * ) Notice: Subject to any disclaimer, the term of this patent is extended or adjusted under 35 U.S.C. 154(b) by 591 days.

(21) Appl. No.: 13/975,740

(22) Filed: Aug. 26, 2013

(65) Prior Publication Data
US 2014/0062164 A1    Mar. 6, 2014

(30) Foreign Application Priority Data
Aug. 28, 2012    (DE) .......... 10 2012 016 945

(51) Int. Cl.
*B60B 27/00*    (2006.01)
*F16D 41/36*    (2006.01)
*F16D 27/01*    (2006.01)

(52) U.S. Cl.
CPC .......... *B60B 27/0047* (2013.01); *F16D 27/01* (2013.01); *F16D 41/36* (2013.01)

(58) Field of Classification Search
CPC .......... F16D 27/01; F16D 41/00–41/36; B60B 27/0047
USPC .................. 192/64, 84.3, 69.8–69.83, 56.42
See application file for complete search history.

(56) References Cited

U.S. PATENT DOCUMENTS

| | | | |
|---|---|---|---|
| 2,055,723 A * | 9/1936 | Hope | F16D 27/09 192/108 |
| 3,240,304 A | 3/1966 | Wickersham | |
| 3,680,673 A | 8/1972 | Webb | |
| 3,726,373 A * | 4/1973 | Miller | F16D 41/22 192/35 |
| 6,588,564 B1 | 7/2003 | Jaeger et al. | |
| 2009/0255774 A1 | 10/2009 | Hsu | |
| 2012/0048671 A1* | 3/2012 | Kozak | B60B 27/047 192/64 |
| 2013/0092495 A1* | 4/2013 | Tho | F16D 41/32 192/64 |
| 2013/0126292 A1* | 5/2013 | Lin | F16D 41/32 192/64 |
| 2014/0060992 A1* | 3/2014 | Spahr | F16D 27/01 192/64 |

FOREIGN PATENT DOCUMENTS

| | | |
|---|---|---|
| DE | 2932661 | 3/1981 |
| DE | 196 00 545 | 7/1997 |
| DE | 19847673 A1 | 4/2000 |
| DE | 20 2011 108 822 | 4/2012 |

* cited by examiner

*Primary Examiner* — Mark A Manley
(74) *Attorney, Agent, or Firm* — Greer, Burns & Crain, Ltd.

(57) ABSTRACT

A hub is provided for two-wheeled vehicles having a hub axle, a hub body, a rotatable driving device, and having a toothed disk freewheel. The toothed disk freewheel includes a pair of engagement components cooperating with one another, each having at least one axial toothing. The axial toothings are biased to an engaging position via a biasing device. The biasing device is configured as a pulling force device which pulls both axial toothings together.

4 Claims, 3 Drawing Sheets

HUB, IN PARTICULAR FOR PARTIALLY MUSCLE-POWERED VEHICLES

BACKGROUND

The present invention relates to a hub for at least partially muscle-powered vehicles and in particular for two-wheeled vehicles. Such a hub comprises a fixed hub axle, a hub body rotatable relative thereto, a rotatable driving device, as well as a toothed disk freewheel. Such a driving device may for example be configured as a rotor to which a sprocket or else a set of sprockets may be mounted for transmitting the driving torque via the driving device to the hub body. Optionally the driving device may be configured integrally with a sprocket or a set of sprockets.

In the prior art, hubs have become known which provide a freewheeling function via a toothed disk freewheel. Thus, DE 198 476 73 A1 discloses a rear wheel hub having a toothed disk freewheel wherein two toothed disks are provided at their side faces with axial toothings meshing with one another. In the driving direction, the torque applied is reliably transmitted while in the reverse rotational direction, the toothed disks axially diverge from one another, thus providing the freewheeling function. To ensure reliable engagement of the toothed disks in the driving direction, both of the toothed disks are urged toward one another by means of coil springs. The known hub operates reliably and has been tried and tested. Good responsivity can be achieved by selecting a suitable spring rigidity of the press-on springs. There is a certain disadvantage though in that friction arises in the freewheeling state at the toothed disks due to the toothed disks gliding upon one another when the axial toothings are urged away from one another. Moreover, noises are emitted which are not always perceived as agreeable. The biasing springs apply a certain force already in the engaging position for retaining the two toothed disks in secure engagement. This press-on force and thus the friction increases further as the freewheeling function begins and the biasing springs are urged away from one another while being compressed.

SUMMARY

It is therefore the object of the present invention to provide a hub which allows a reliable function and in which the press-on force of the toothed disk freewheel does not increase as much with the distance between the freewheeling components increasing.

A hub according to the invention is in particular provided to be employed in at least partially muscle-powered vehicles and in particular two-wheeled vehicles and preferably bicycles or the like. The hub comprises a hub axle and a hub body and a rotatable driving device, as well as a toothed disk freewheel. The toothed disk freewheel comprises a pair of engagement components cooperating with one another, each having at least one axial toothing. The axial toothings are biased to an engaging position via at least one biasing device. At least one of the at least one biasing device is configured as a pulling force device which pulls both the axial toothings toward one another.

The hub according to the invention has many advantages. One considerable advantage of the hub according to the invention consists in that at least one biasing device is configured as a pulling force device. Known hubs with toothed disk freewheels are provided with compression springs as biasing devices. Since as a rule the available mounting space is very limited, these compression springs as biasing devices show a relatively steep progression such that with increasing deflection of the toothed disks out of the engaged state the biasing force increases correspondingly. This leads to increased friction of the toothed disks in the freewheeling state and to a correspondingly loud noise. The increased friction also causes the required torque to increase accordingly for freely rotating the freewheel. This results in increased wear and may optionally lead to chain sag which in turn may be a problem for the function of the chain drive and the shifting. Most of these problems are presently avoided.

The fact that a biasing device based on the pulling force is now employed avoids these drawbacks. This kind of pulling force device acts onto both the axial toothings. The pulling force device pulls the two biasing devices together. This allows setting different relationships in which the force path over the deflection does not increase as much or even drops.

Particularly preferably at least one biasing device at least at one engagement component is a magnetic device or comprises a magnetic device. Such a configuration is particularly advantageous because a biasing device acting on the basis of magnetic forces also allows a contactless configuration. Then a mechanical spring is not required as the biasing device.

It is possible for only one engagement component to comprise a magnetic device comprising in particular a permanent magnet. The other of the engagement components then consists at least in part of a magnetically conducting material which is attracted by the magnetic field of the magnetic device.

Particularly preferably both engagement components comprise at least one magnetic device each. When installed as intended one magnetic device each may be coupled or connected with any of the two axial toothings. The magnetic devices are disposed such that a south pole of a magnetic device of one of the axial toothings is disposed adjacent to a north pole of the magnetic device of the other of the axial toothings such that the axial toothings attract one another by way of the magnetic forces acting between the magnetic devices. Two magnetic devices wherein each of the axial toothings is coupled or connected with one magnetic device allow by way of simple means a reliable structure of a hub which also has a low weight.

In preferred configurations at least one engagement component comprises at least one receiving space for at least one magnetic device. In such a configuration the magnetic device can be placed and fixed at or in the receiving space of the engagement component. Such a magnetic device may for example be received in the receiving space by way of force-fit and/or form-fit. The magnetic device may for example be inserted, glued in, screwed, or coupled or connected with, or received at, the engagement component in some other way. A loss-proof and e.g. fixed connection with the axial toothing is advantageous such that corresponding forces act on the axial toothing by way of the magnetic field of the magnetic device. The magnetic device may also be received in the engagement component loosely or with some play, in case that the engagement component substantially moves jointly with the magnetic device. It is also possible and preferred for at least one engagement component to be at least partially magnetic per se such that at least one engagement component does not require a separate magnetic device.

A considerable advantage of magnetic biasing devices is that of less wear. The moving mass may likewise be reduced so as to improve dynamics.

In preferred configurations the magnetic device comprises a carrier unit or multiple carrier units and magnetic units disposed thereat. The magnetic units may be fastened to the carrier unit in a known way. When fastening the magnetic units at the carrier unit particular care is taken that the orientation of north and south poles of the magnetic unit corresponds to the desired orientation. The arrangement is such that the engagement components attract one another by way of the magnetic field. In the case of freewheeling the engagement components or the axial toothings are urged away from one another counter to the axially inwardly pulling force of the field of the magnetic devices.

In all the configurations, it is possible for the, or at least one magnetic device to comprise multiple magnetic units disposed in receiving units of the engagement component and/or of the axial toothing. An engagement component may for example be configured as a toothed disk. In preferred configurations, both the engagement components are configured as a toothed disk each. Such a toothed disk consists of a circular structure comprising an axial toothing at one axial side face. The circular structure may, for example comprise bore holes or the like into which magnetic units can be inserted from the side facing the axial toothing. When this procedure is followed for both the toothed disks and the orientation of the magnetic units is maintained accordingly, then the adjacent toothed disks attract one another accordingly due to the magnetic force of the magnetic devices.

To adjust the strength of the magnetic field it is possible to not provide all of the receiving units with magnetic units but a smaller number only.

For finely adjusting the acting magnetic field, magnetic units or magnetic devices of different materials or magnetic units of different strengths can be employed.

A different number of magnetic units and/or magnetic devices with differently strong magnetic units also offer the advantage to specify or predetermine different conditions in relation to the range of application. Thus, in the case of a mountain bike a large number of teeth on a toothed disk tends to be provided for quick engagement. Then a comparatively strong magnetic field may be preferred, optionally with many and/or strong magnetic units. In the case of a racing bicycle, however, toothed disks having a smaller number of teeth (e.g. 36 instead of 72, thus half the number) tend to be used which cause less friction in the freewheeling state. Now a smaller number and/or weaker magnetic units may be employed. This specific embodiment of the invention realizes a magnetic field of different strengths using reasonable efforts.

Particularly preferably both the engagement components are configured as toothed disks. One of these toothed disks is disposed non-rotatably and axially displaceably at the hub body and the other toothed disk is provided non-rotatably and axially displaceably at the driving device.

It is also possible for one of the axial toothings to be provided directly at the hub body or at the driving device. For example an axial toothing may be configured integrally with the driving device. In this configuration one of the engagement components forms the driving device and the other engagement component is configured as a toothed disk which is non-rotatably but axially displaceably received in the hub body.

It is also possible for an axial toothing to be non-rotatably and in the axial direction fixedly connected with the hub body and for the other of the axial toothings to be non-rotatably but axially displaceably received in the driving device.

It is also possible to provide at least one mechanical biasing device which is configured as an extension spring and pulls the two axial toothings toward one another or together. Such a biasing device in particular grips behind both the toothed disks. A middle region of such a biasing device may be configured for example resilient, accordion-type, as an extension spring or the like.

A cylinder or cylinder-type body of an elastic material which pulls the biasing devices together is also possible. It is possible for the pulling force device as the mechanical biasing device to extend through the interior of the engagement components and to act on the biasing devices from the outside. In this case the biasing device again acts as a pulling force device.

In this configuration, the spring rigidity may change only to a minor extent or virtually not at all even if the toothed disks deflect out of the engaged state. Depending on the layout the spring rigidity may change to a larger extent. One advantage of this solution is that the two toothed disks form a modular unit which is held together by the biasing device even in the demounted state.

In all the configurations, it is also possible to provide at least one mechanical biasing device which is configured as a compression spring and which biases an axial toothing toward the other axial toothing at least in specific conditions.

It is also preferred to provide such a mechanical biasing device in addition to a magnetic pulling force device to increase or ensure the press-on force of the toothed disks onto one another in the case of large deflections of the toothed disks. Magnetic forces between pairs of magnetic components decrease with their distance from one another. With too large distances or relatively weak magnetic components the force may fall below a minimum. To counteract this, an additional mechanical compression spring may be provided which for example acts only in the case of large deflections and which in particular imparts only relatively small forces. Then a minimum of force is generated even in the case of large distances.

BRIEF DESCRIPTION OF THE DRAWINGS

Further advantages and features of the present invention can be taken from the description of the exemplary embodiments which will be discussed below with reference to the enclosed figures.

The drawings show in.

DETAILED DESCRIPTION

Figure 1:
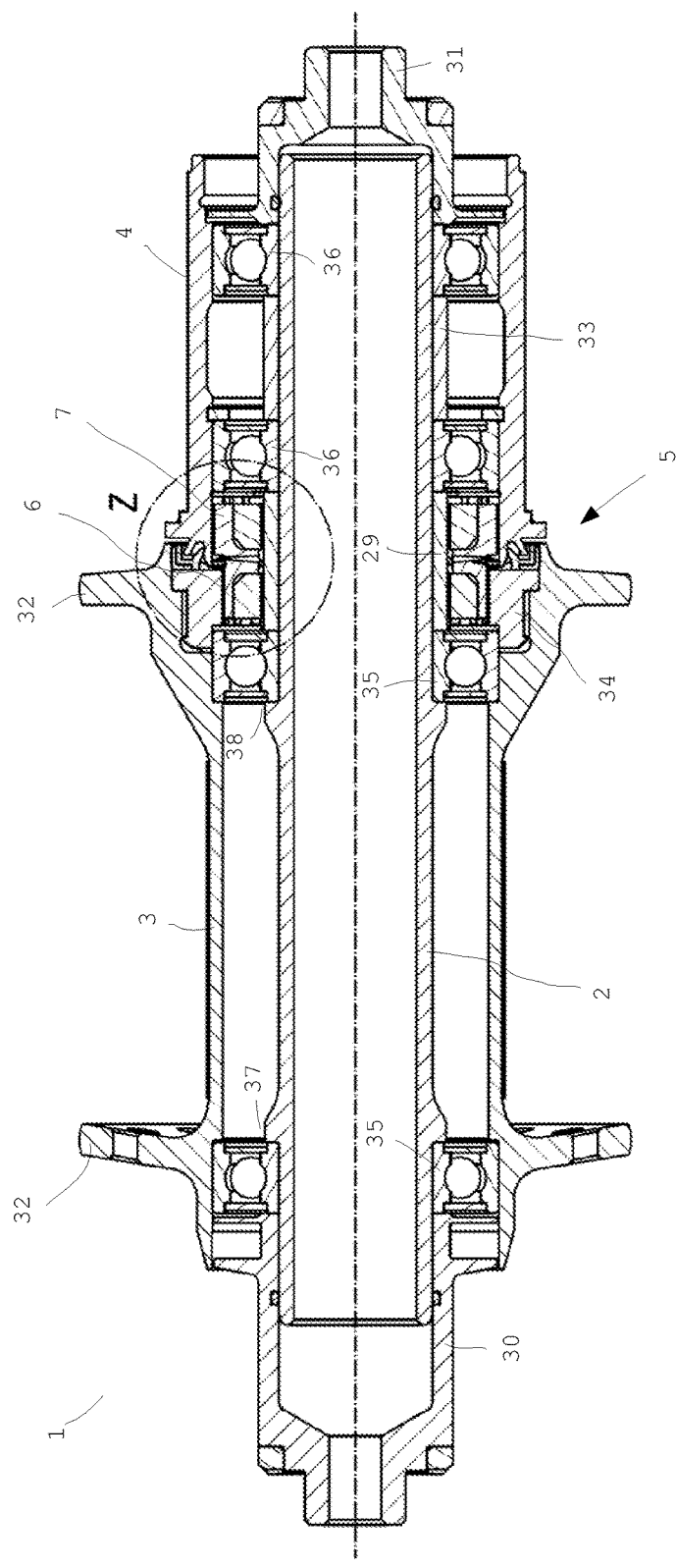
FIG. 1 a schematic cross-section of a hub according to the invention.

FIG. 1 shows a hub 1 configured as a rear wheel hub and suitable to be used in at least partially muscle-powered vehicles and in particular two-wheeled vehicles such as bicycles.

The hub 1 is provided with a fixed axle 2 and a hub body 3 supported via bearings 35 to be rotatable relative to the fixed axle and forming the hub shell and provided with spoke flanges 32 for receiving spokes. A driving device 4 is presently configured as a rotor at which a sprocket cluster may be received. A toothed disk freewheel 5 between the driving device 4 and the hub body 3 enables a freewheeling function.

The driving device 4 is supported via bearings 36 to be rotatable relative to the hub axle 2. Adapter rings 30 and 31 in the shape of limit stops are pushed onto the ends of the fixed hub axle 2. The adapter rings 30 and 31 are provided with seals to protect the interior of the hub body 3 or the driving device 4 from penetrating dust and water.

In mounting, the adapter rings 30 and 31 are pushed into the dropouts of a bicycle. The hub may be fixed by means of a quick release (not shown). It is also possible and preferred to use a through axle. A force-fit will occur between the two dropouts. The force is presently transmitted from the adapter ring 30 via the inner ring of the bearing 35 to the shoulder 37 of the axle and along the axle 2 via the shoulder 38 and the inner ring of the bearing 35 to the spacer sleeve 29. From there the force is transmitted via the inner ring of the bearing 36 and the spacer sleeve 33 to the inner ring of the second bearing 36 and finally to the adapter ring 31 and introduced into the other dropout.

The toothed disk freewheel 5 is provided with two engagement components 6 and 7 which are presently configured as toothed disks 25 and 26. The toothed disk 25 is provided with the axial toothing 8 and the toothed disk 26 comprises the axial toothing 9 which are in engagement with one another in the engaging position 11 illustrated in FIG. 1.

Figure 2:
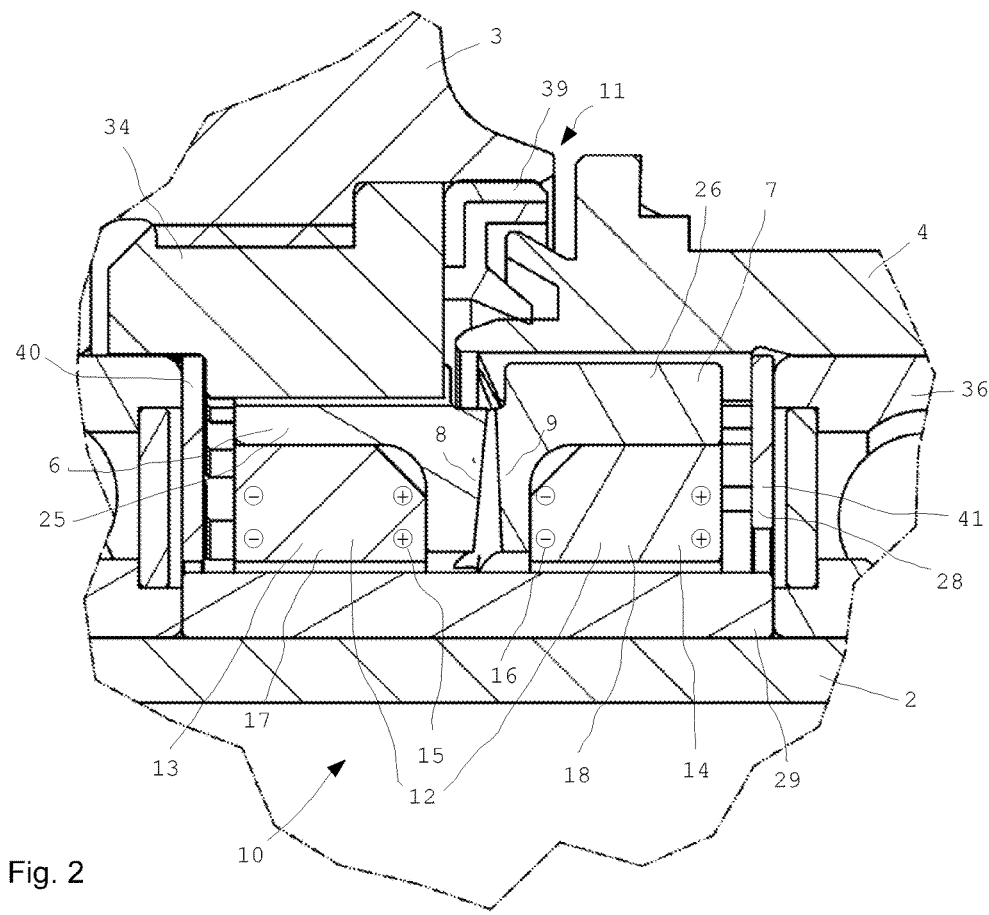
FIG. 2 an enlarged illustration of the detail "Z" of FIG. 1.

FIG. 2 shows the enlarged detail "Z" to better discuss the toothed disk freewheel 5. The engagement component 6 or toothed disk 25 is non-rotatably and axially displaceably received in the threaded ring 34 which is screwed into the hub body 3. While the hub body 3 preferably consists of a light metal or the like, the threaded ring 34 in particular consists of a stronger material such as steel. In this way a longer service life is achieved. The engagement component 7 or toothed disk 26 is non-rotatably and axially displaceably received in the driving device 4 which preferably consists of a stronger material such as steel. For sealing between the driving device 4 and the hub body 3 a seal 39 is provided which may comprise a labyrinth seal and an elastomeric seal.

A magnetic device 13 is inserted into the receiving space 17 of the toothed disk 25. A magnetic device 14 is inserted into the receiving space 18 of the toothed disk 26. The magnetic devices 13 and 14 are disposed such that the south pole 15 of the magnetic device 13 is disposed adjacent to the north pole 16 of the magnetic device 14.

Thus the magnetic devices 13 and 14 form the pulling force device 12 as the biasing device 10 which causes the biasing of the two toothed disks 25 and 26 to the engaging position 11.

Stoppers 40 and 41 may be provided laterally of the toothed disks 25 and 26 which limit an axial motion of the toothed disks for example to prevent the freewheel from jamming.

It is also possible and preferred for the parts 40 and 41 to serve for example as the biasing device 28. Then the biasing devices 28 provide a counterforce in particular only in the case of a large deflection. To this end such a biasing device 28 may for example consist of an elastic material that is compressible.

Figure 3:
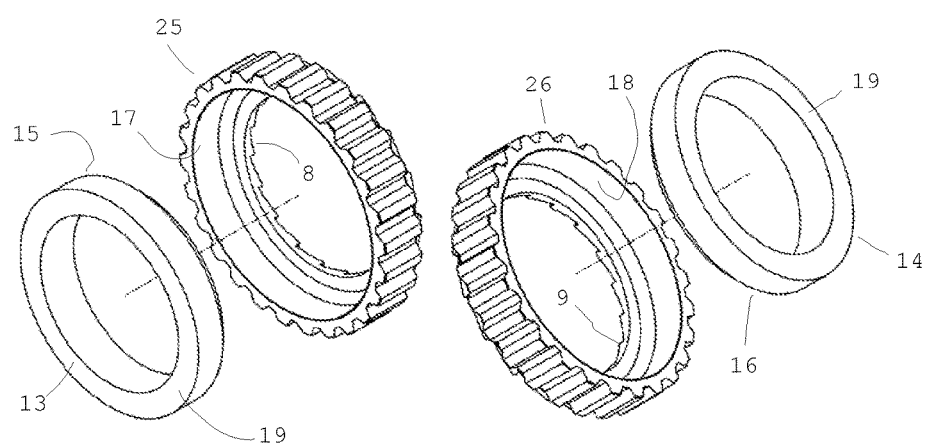
FIG. 3 a perspective view of the two toothed disks of the hub according to FIG. 1.

FIG. 3 shows the configurations of the toothed disks 25 and 26 according to FIG. 2 in a perspective illustration. The radially external toothing of the toothed disks 25 and 26 is recognizable. By means of this external toothing the toothed disks 25 and 26 glide in appropriate radially internal toothings in the threaded ring 34 and in the driving device 4. The magnetic devices 13 and 14 are firmly received in the receiving spaces 17 and 18. The magnetic devices 13 and 14 are for example respectively fastened in the toothed disks 25 and 26 by way of force fit. It is also possible for the magnetic devices 13 and 14 to be glued into, or otherwise fastened in, the toothed disks 25 and 26. The magnetic device 14 is presently configured as a magnetic ring 19 and is pushed into the toothed disk 26 with its front face which presently constitutes the north pole 16 of the magnetic device 14 and which faces the toothed disk 26.

The magnetic disk 13 is pushed into the toothed disk 25 with its front face constituting the south pole 15 first such that the two toothed disks 25 and 26 attract one another. The two toothed disks 25 and 26 are pulled together due to the acting magnetic field.

Figure 4:
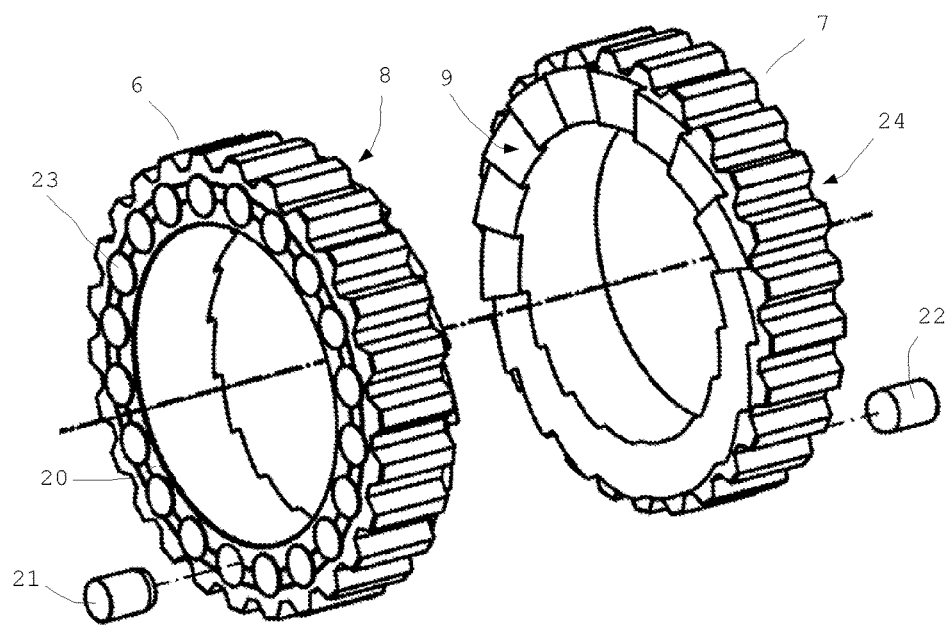
FIG. 4 alternative toothed disks for the hub according to FIG. 1.

FIG. 4 shows variants of toothed disks 25 and 26. For example the toothed disk 25 which is actually configured solid may be provided with bores as the receiving units 23 into which the magnetic units 21 can be inserted. When the magnetic units 21 are inserted into the receiving units 23 the magnetic orientation of the magnetic unit 21 is observed.

Or else it is possible for the toothed disks 25 and 26 to be provided with an insert as the carrier unit 20 wherein corresponding receiving units 23 are provided in the carrier unit 20 for receiving corresponding magnetic units 21. In this configuration the carrier unit 20 may consist of a lighter material such as a plastic such that the total weight of the hub 1 can be lowered.

Figure 5:
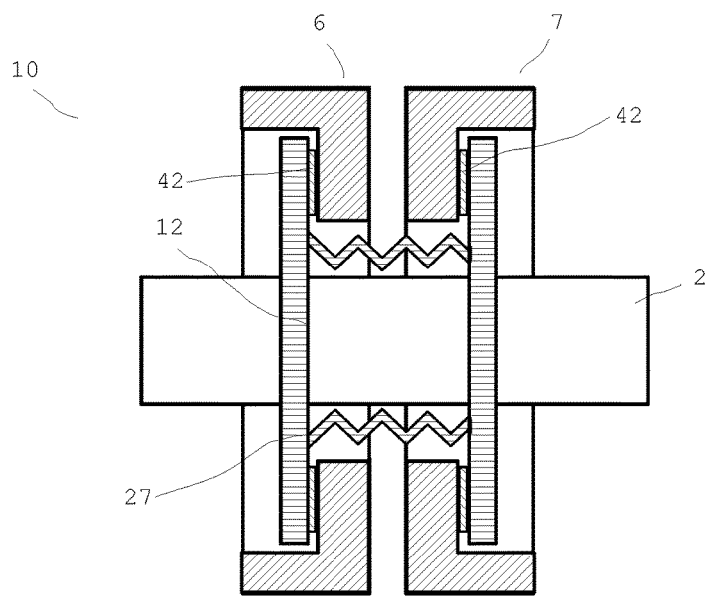
FIG. 5 another simplistic section through a toothed disk freewheel of the hub according to FIG. 1.

FIG. 5 shows a simplistic illustration of an exemplary embodiment where the toothed disk freewheel 5 is provided with toothed disks 6 and 7 which are pulled toward one another by way of a mechanical biasing device 27. Presently the mechanical spring acts as the pulling force device 12. For reducing the friction of the pulling force device 12 relative to the toothed disks 25 and 26 in the freewheeling state an appropriate lubricant may be introduced. Or else it is possible to support the mechanical spring opposite one or both of the toothed disks for example via bearings configured as needle bearings 42 which may optionally be provided not with a housing but only a needle cage. It is possible to provide the bearing 42 at both the toothed disks 25 and 26 or else at one only.

On the whole the invention provides a hub 1 which can provide favorable force relationships both in the engaged state and in the freewheeling state. The friction in the freewheeling state can be reduced such that noise emissions are also reduced. The use of permanent magnets which are disposed in the toothed disks such that the toothed disks attract one another allows to realize a particularly simple configuration which enables a permanently reliable function. In case that the attractive force between the two toothed disks is not sufficient in the freewheeling state, the biasing force can be increased from outside for example by way of a mechanical compression spring having a low spring force. This allows to balance for example a decrease of the press-on force as the toothed disks increasingly deflect from one another.

| List of reference numerals: | |
| --- | --- |
| 1 | hub |
| 2 | hub axle |
| 3 | hub body |
| 4 | driving device |
| 5 | toothed disk freewheel |
| 6 | engagement component |

-continued

| | List of reference numerals: |
|---|---|
| 7 | engagement component |
| 8 | axial toothing |
| 9 | axial toothing |
| 10 | biasing device |
| 11 | engaging position |
| 12 | pulling force device |
| 13 | magnetic device |
| 14 | magnetic device |
| 15 | south pole |
| 16 | north pole |
| 17 | receiving space |
| 18 | receiving space |
| 19 | magnetic ring |
| 20 | carrier unit |
| 21 | magnetic unit |
| 22 | magnetic unit |
| 23 | receiving unit |
| 24 | receiving unit |
| 25 | toothed disk |
| 26 | toothed disk |
| 27 | biasing device |
| 28 | biasing device |
| 29 | spacer sleeve |
| 30 | adapter ring |
| 31 | adapter ring |
| 32 | spoke flange |
| 33 | spacer sleeve |
| 34 | threaded ring |
| 35 | bearing |
| 36 | bearing |
| 37 | shoulder |
| 38 | shoulder |
| 39 | seal |
| 40 | stopper |
| 41 | stopper |
| 42 | bearing |

The invention claimed is:

1. A hub for at least partially muscle-powered vehicles and in particular two-wheeled vehicles, comprising:
a hub axle;
a hub body;
a rotatable driving device; and
a toothed disk freewheel;
said freewheel comprises a first engagement component and a second engagement component cooperating with one another, each of said first and second engagement components having an inner surface and an outer surface, and at least one axial toothing protruding outwardly from said outer surface of said first and second engagement components, and a radially closed internal receiving space defined by said inner surface;
said first and second engagement components are each provided with a magnetic device mounted in said radially closed internal receiving space of said first and second engagement components and, when installed as intended, a south pole of the magnetic device of the first engagement component or the second engagement component is disposed adjacent to a north pole of the magnetic device of the first engagement component or the second engagement component, such that the axial toothings attract one another via the magnetic forces acting between the magnetic devices,
wherein the axial toothings are biased to an engaging position via said magnetic device of each of said first and second engagement components, each of said magnetic devices cooperating to form a pulling force device which pulls both the axial toothings toward one another.

2. The hub according to claim 1, wherein the magnetic device comprises at least one magnetic ring which is received at one of said first and second engagement components.

3. The hub according to claim 1, wherein at least one of said first and second engagement components is configured as a toothed disk.

4. The hub according to claim 1, wherein both of said first and second engagement components are configured as toothed disks and wherein one of the toothed disks is disposed non-rotatably and axially displaceably at the hub body and the other of the toothed disks is disposed non-rotatably and axially displaceably at the driving device.

* * * * *